W. B. GOODWIN.
VEHICLE.
APPLICATION FILED DEC. 22, 1913.
1,171,941.
Patented Feb. 15, 1916.
2 SHEETS—SHEET 1.
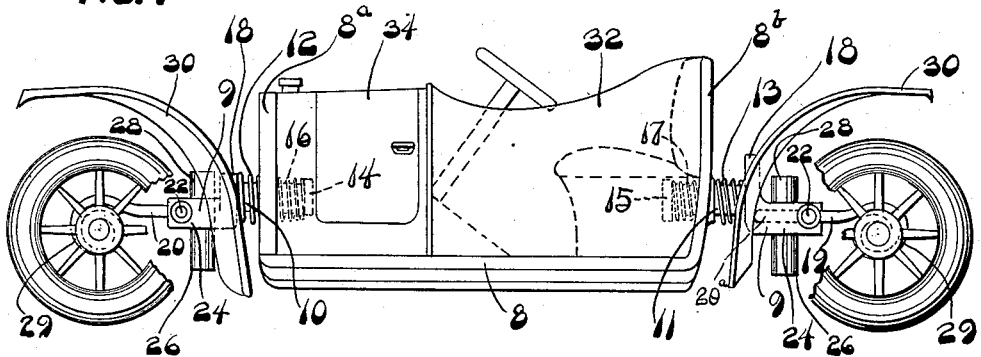
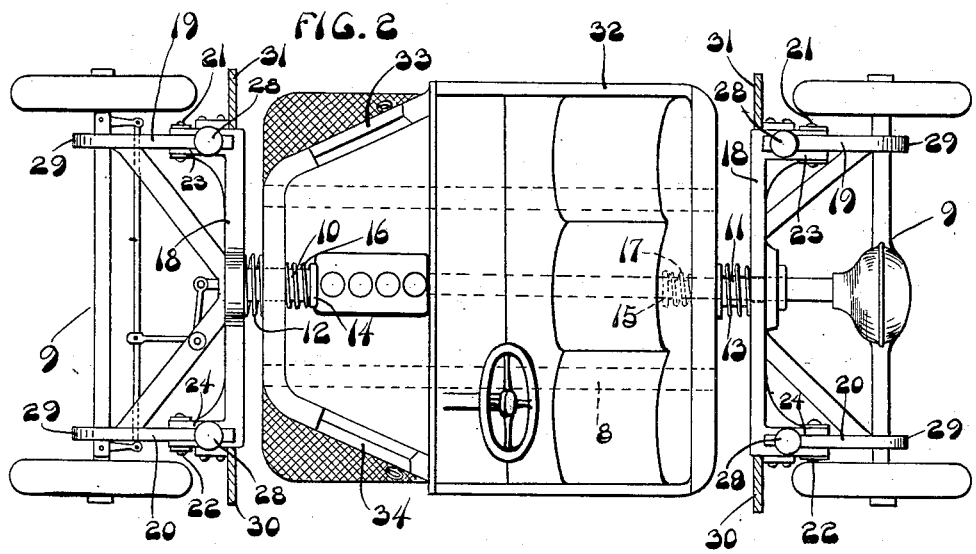
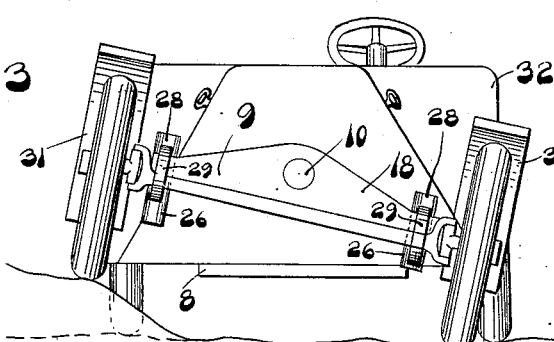
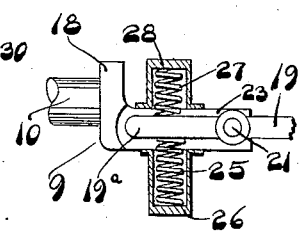
WITNESSES
INVENTOR
William B. Goodwin
BY
ATTORNEY W. B. GOODWIN.
VEHICLE.
APPLICATION FILED DEC. 22, 1913.
1,171,941.
Patented Feb. 15, 1916.
2 SHEETS—SHEET 2.
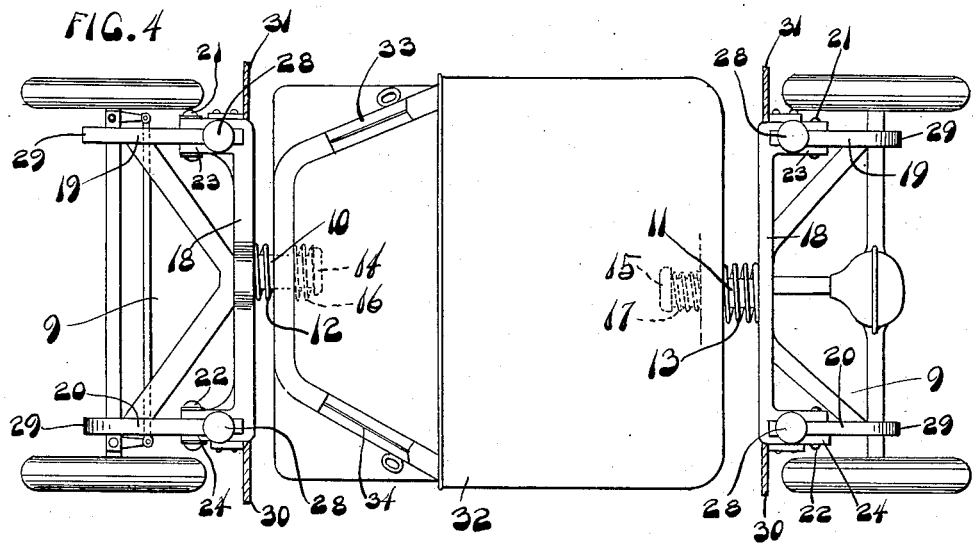
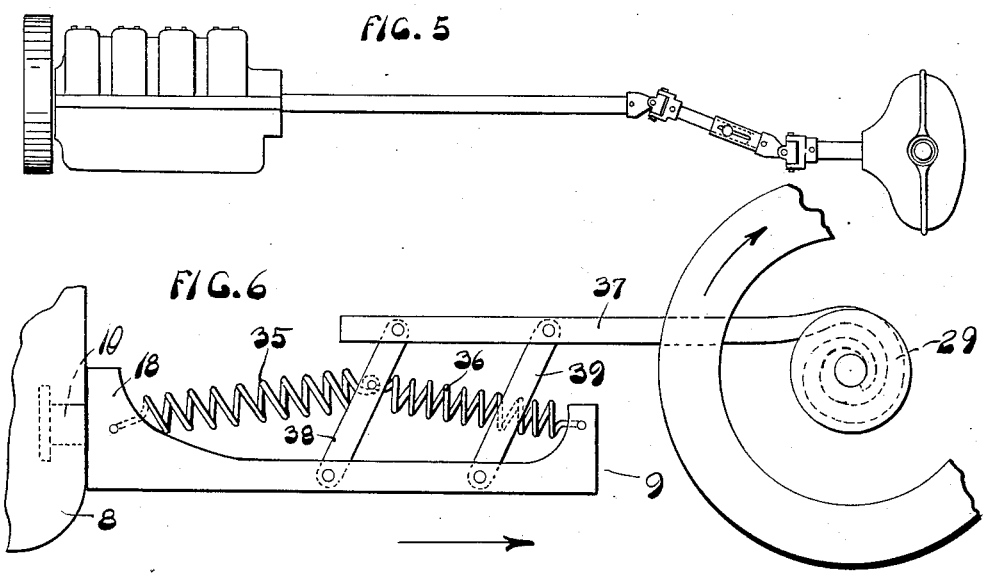
WITNESSES
H. Thornton Fogert
B. B. Kropf
INVENTOR
William B. Goodwin
BY Walter F. Murray
ATTORNEY
THE COLUMBIA PLANOGRAPH CO., WASHINGTON, D. C.

UNITED STATES PATENT OFFICE.

WILLIAM B. GOODWIN, OF COLUMBUS, OHIO.

VEHICLE.

1,171,941. Specification of Letters Patent. Patented Feb. 15, 1916.

Application filed December 22, 1913. Serial No. 808,083.

*To all whom it may concern:*

Be it known that I, WILLIAM B. GOODWIN, a citizen of the United States of America, and resident of Columbus, county of Franklin, and State of Ohio, have invented certain new and useful Improvements in Vehicles, of which the following is a specification.

This invention relates to improvements in vehicle construction and particularly to the mounting of the vehicle body on the wheel carrying chassis.

An object of my invention is to produce a vehicle construction in which the body is mounted on a chassis or framework which is so mounted with reference to a separate wheel-carrying chassis located at each end of the body-carrying chassis, that the shocks ordinarily sustained by the body portions of vehicles of this class are reduced to a minimum.

A further object is to produce a vehicle in which the body is mounted between the wheels so that a uniformly wide body may be obtained from its top to its bottom, which is or may be equal to the distance from outside to outside of the wheels.

These and other objects are attained in the construction described in the following specification and illustrated in the accompanying drawings in which:—

Figure 1 is a side elevation of a vehicle embodying my invention. Fig. 2 is a plan view of the vehicle illustrated in Fig. 1. Fig. 3 is a front end elevation of the vehicle illustrated in Fig. 1. Fig. 4 is a plan view showing a somewhat different manner of mounting the vehicle body on each wheel-carrying chassis. Fig. 5 is a detail of the driving connection between the engine shaft and the rear axle. Fig. 6 is an enlarged detail elevational view of a modified form of wheel mounting chassis and its pivotal connection with the vehicle body. Fig. 7 is a detail sectional view of a shock absorbing device used on the car embodying my invention.

The construction comprises a primary or body-carrying chassis 8, to each end of which a secondary or wheel-carrying chassis 9 is secured. Each secondary chassis is pivotally secured to the ends of the primary chassis by means of journal pins 10 and 11, which are rotatably mounted in bearings provided in the primary chassis. Mounted on these journal pins between each secondary chassis and the primary chassis are springs 12 and 13, while between heads 14 and 15 formed on the inwardly projecting ends of the pins, and the inner faces of the vertically extending portions $8^a$, $8^b$, of the primary chassis, are located springs 16 and 17.

Each secondary chassis consists of a bolster 18 which bears one of the journal pins 10 and 11 between its ends, while at each end thereof, spring arms 19 and 20 are pivotally mounted on pins 21 and 22. These pins are located in forked brackets 23 and 24 extending from the bolster. A short portion $19^a$, $20^a$, of each respective spring arm 19 and 20, extends beyond the pivotal point thereof and into the space between the branches of the forked brackets to form a movable bearing for one end of a shock absorbing spring 25 located in a hollow cylindrical support 26, secured to the under side of each of the brackets while the top surface of each portion $19^a$, and $20^a$ bears upon a short recoil spring 27 located in a hollow cylindrical support 28 secured to the upper surface of each bracket. The outer or axle-carrying end of each spring arm may be formed into a spiral spring 29 which is secured to its respective axle at a point near the proper end thereof.

Mud guards 30, 31 are mounted on each secondary chassis, the front chassis carrying the usual steering gear, and the rear chassis carrying the live axle, its casing, and the differential and its casing.

The body 32 of the vehicle is mounted on the primary chassis and because of the placing of the front and rear wheels in the fore and aft position with relation to the vehicle body it may be constructed in width equal to the distance from outside to outside of the wheels. By reason of the location of the wheels, a uniformly wide body construction is permitted, from the top to the floor.

It will be seen by referring to Figs. 1 and 2, that I preferably construct the main body of my vehicle without doors and in order to gain an entrance to its interior I provide a wide hood over the engine, in which I place doors 33, 34. Since the small space occupied by the engine is in the center of the hood, ample space is left on either side thereof to form entrance ways from the doors to the interior of the body proper. In providing a body of this construction, room is obtained not only for the storage of packages, but also for the accommodation of at least three passengers abreast without any crowding on the seat, and with no cramping of the floor space for the feet of the passengers. The steering of the vehicle is accomplished in much the same manner as is ordinarily done in self propelled vehicles.

In traveling along the road, first the front wheels of the vehicle will encounter inequalities in the road surface and the shock will be transmitted in a line extending diagonally upward and backward. Part of the shock is initially absorbed by the sensitive spiral springs 29 of the spring arms 19 and 20, but the vertical component of the force of the shock is absorbed by the coil springs 25 mounted vertically in the cylinders 26, when the portions 19ª, 20ª of the spring arms 19 and 20 are moved by the rocking of the spring arms upon their pivot pins 21 and 22. The horizontal component of the force of the shock is absorbed, however, through the coil spring 12 located on the chassis journal pin 10, when the front chassis is forced backwardly. Should the shock transmitted to the front chassis have been great enough, the entire body and its mounting chassis 8 will be forced backwardly and the excess of the shock will be absorbed by the spring 13 on the journal pin 11 of the rear chassis. The recoil of springs 12 and 13 will be absorbed by springs 16 and 17 while the recoil of springs 25 will be absorbed by springs 27. The construction of spiral spring 29 will enable it to absorb its own recoil.

After the wheels of the front chassis have passed over the obstruction, the wheels of the rear chassis encounter it. The shock now transmitted to the rear chassis, extends in the same direction as that transmitted to the front chassis, except that in absorbing the horizontal component of the shock the chassis is pulled in a direction away from the body instead of being pushed toward it as in the former case. The springs 29, 25 and 27 will operate in the same manner and perform the same functions as the corresponding springs of the front chassis, but instead of the springs 16 and 17 absorbing the recoil of the springs 12 and 13, they now absorb the horizontal component of the shock while the springs 12 and 13 absorb the recoil of springs 16 and 17.

Should the wheels on one side of the vehicle encounter obstacles as shown in Fig. 3, first the front and then the rear chassis would tip, the journal pins 10 and 11 permitting of this rocking movement. The position of the body during this movement of the front and rear chassis would remain substantially undisturbed as far as transverse-horizontal and vertical alinement is concerned, because I preferably so locate the journal pins 10 and 11, that a greater proportion of the weight of the body, when filled with passengers, will be below the journal pins, thus creating in effect, a pendulum-like suspension thereof.

Should the distribution of weight on the primary or body carrying chassis be such that the greater part of the weight comes at or above the points of suspension, I offset the journal pins with relation to each other as shown in Fig. 4, so that they lie on opposite sides of a line drawn through the center of the vehicle from front to rear. This offsetting of the journal pins permits of the movement of each secondary chassis upon its respective journal pin, but will not permit the body to swing as in the construction disclosed in Fig. 2.

Owing to the relative movements of the primary and each secondary chassis, a double universal, telescoping shaft drive, as shown in Fig. 5, will be necessary although the car may be readily driven by chain or otherwise.

In Fig. 6 I have shown a modified form of secondary chassis. It will be seen that an obstruction in the road will cause the coil springs 35, 36 to perform all the functions of the springs 25, 27, 12, 13, 16 and 17, when the wheel, spring arm 37 and its mounting links 38, 39, swing upwardly and backwardly in response to the initial blow and recoil given to the wheels on either secondary chassis by the obstruction.

Having thus described my invention what I claim is:—

1. A vehicle construction comprising a primary chassis, secondary chassis located beyond the limits of the primary chassis, and pivots connecting the primary and secondary chassis, said secondary chassis being independent of one another.

2. A vehicle comprising a primary chassis, and a secondary chassis located at each end and beyond the limits of the primary chassis and having horizontal pivots attached to the primary chassis, each secondary chassis being independent of the other secondary chassis.

3. A vehicle comprising a primary chassis and a secondary chassis yieldingly secured to each end of the primary chassis, beyond the limits thereof, said secondary chassis being independent of one another.

4. In a vehicle, the combination of a body chassis, a steering wheel chassis pivotally and yieldingly secured to the front of the body chassis, and a driving wheel chassis pivotally and yieldingly secured to the rear of the body chassis, said steering wheel chassis and said driving wheel chassis being located beyond the limits of said body chassis.

5. In a vehicle the combination of a primary chassis, a secondary chassis secured to the front of the primary chassis, a secondary chassis secured to the rear of the primary chassis, road wheels mounted on both the front and the rear secondary chassis, means for yieldingly supporting the wheels to take up vertical movement thereof and means for permitting yielding horizontal movement of each secondary chassis with relation to the primary chassis.

6. A vehicle comprising a primary chassis, a secondary chassis pivotally attached to and beyond each end of the primary chassis, and bearing road wheels, a source of power mounted on the primary chassis and means adapted to compensate for the relative movement of the primary chassis and the secondary chassis, for communicating driving power from the source of power to the road wheels.

7. A vehicle comprising a primary chassis, and a secondary chassis pivotally attached to each end of the primary chassis, the pivotal points being offset with relation to the center line of the vehicle.

8. A vehicle comprising a primary chassis, a secondary chassis pivotally attached to each end of the primary chassis, each secondary chassis comprising a bolster, pivots attached to the bolster and adapted to engage the primary chassis and wheel carrying spring arms pivotally attached to the bolster, said arms being yieldingly mounted on the bolster.

In testimony whereof, I have hereunto subscribed my name this 19th day of December, 1913.

WILLIAM B. GOODWIN.

Witnesses:
WALTER F. MURRAY,
W. THORNTON BOGERT.

Copies of this patent may be obtained for five cents each, by addressing the "Commissioner of Patents, Washington, D. C."